United States Patent
Steen et al.

(10) Patent No.: US 9,398,759 B2
(45) Date of Patent: Jul. 26, 2016

(54) INDEXING SYSTEM FOR AN IN OVO INJECTION APPARATUS, AND ASSOCIATED METHOD

(71) Applicant: Zoetis Services LLC, Florham Park, NJ (US)

(72) Inventors: Paul Archie Steen, Apex, NC (US); Michael Glenn Schnupper, Raleigh, NC (US); Daniel Scott Rees, Zebulon, NC (US)

(73) Assignee: Zoetis Services LLC, Florham Park, NJ (US)

(*) Notice: Subject to any disclaimer, the term of this patent is extended or adjusted under 35 U.S.C. 154(b) by 379 days.

(21) Appl. No.: 13/649,317

(22) Filed: Oct. 25, 2012

(65) Prior Publication Data

US 2013/0104805 A1    May 2, 2013

Related U.S. Application Data

(60) Provisional application No. 61/554,631, filed on Nov. 2, 2011.

(51) Int. Cl.
  *A01K 45/00* (2006.01)
  *A01K 43/00* (2006.01)

(52) U.S. Cl.
  CPC .............. *A01K 45/007* (2013.01); *A01K 43/00* (2013.01)

(58) Field of Classification Search
  CPC ............................. A01K 45/007; A01K 43/00
  USPC ............................................................ 119/6.8
  See application file for complete search history.

(56) References Cited

U.S. PATENT DOCUMENTS

| | | | |
|---|---|---|---|
| 3,486,982 A | 12/1969 | Noren | |
| 3,594,285 A | 7/1971 | Noren | |
| 4,903,635 A * | 2/1990 | Hebrank | 119/6.8 |
| 6,240,877 B1 * | 6/2001 | Bounds | 119/6.8 |
| 7,261,053 B2 | 8/2007 | Karaca et al. | |
| 2002/0157613 A1 * | 10/2002 | Phelps et al. | 119/6.8 |
| 2003/0056729 A1 | 3/2003 | Correa et al. | |
| 2004/0144324 A1 * | 7/2004 | Gross et al. | 119/6.8 |

(Continued)

FOREIGN PATENT DOCUMENTS

| | | |
|---|---|---|
| JP | 2002-153262 | 5/2002 |
| JP | 2002-153262 A | 5/2002 |

(Continued)

OTHER PUBLICATIONS

Search Report, ROC (Taiwan) Patent Application No. 101140573 (Translation), Date of Completion of Search Apr. 20, 2014.

(Continued)

*Primary Examiner* — Son T Nguyen
(74) *Attorney, Agent, or Firm* — Scott C. Mayhew

(57) ABSTRACT

An indexing system for an in ovo injection apparatus is provided. Such an indexing system provides a positioning scheme for an egg carrier carrying a plurality of avian eggs to an injection assembly for injection thereof. The indexing system includes an initial stop provided to abut the trailing end of the egg carrier to form a first egg carrier position such that a first subset of the plurality of avian eggs is injected. An intermediate stop is provided to abut the trailing end of the egg carrier to form a second egg carrier position such that a second subset of the plurality of avian eggs is injected. An associated method is also provided.

6 Claims, 12 Drawing Sheets

(56) References Cited

U.S. PATENT DOCUMENTS

2009/0183685 A1 7/2009 Correa et al.
2011/0067633 A1* 3/2011 Correa et al. .................. 119/6.8

FOREIGN PATENT DOCUMENTS

| | | |
|---|---|---|
| JP | 2011-501654 A | 1/2011 |
| TW | 200601961 | 1/2006 |
| TW | 200601961 A | 1/2006 |
| TW | M360870 | 7/2009 |
| WO | WO 2009/039520 A1 | 3/2009 |

OTHER PUBLICATIONS

PCT International Search Report and Written Opinion, International Application No. PCT/IB2012/055881, Date of Mailing Mar. 25 2013.

* cited by examiner

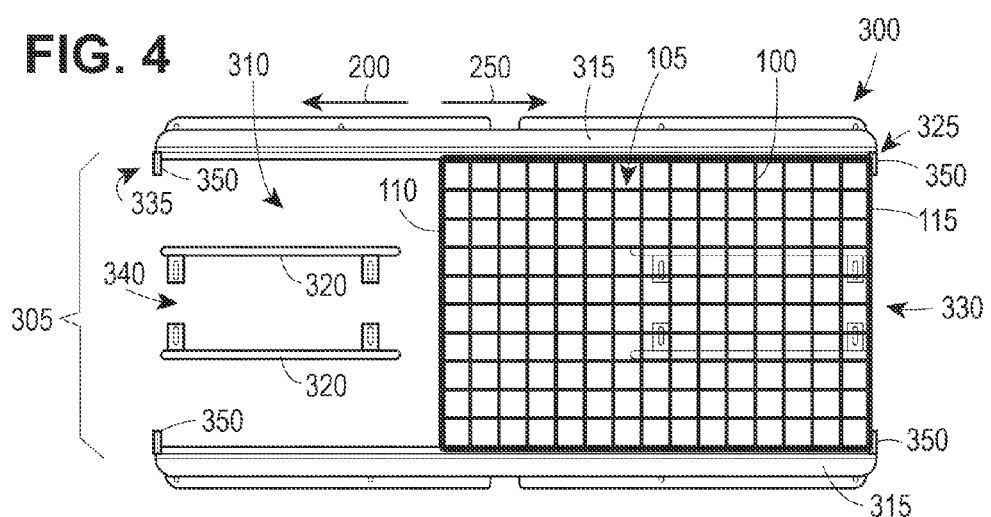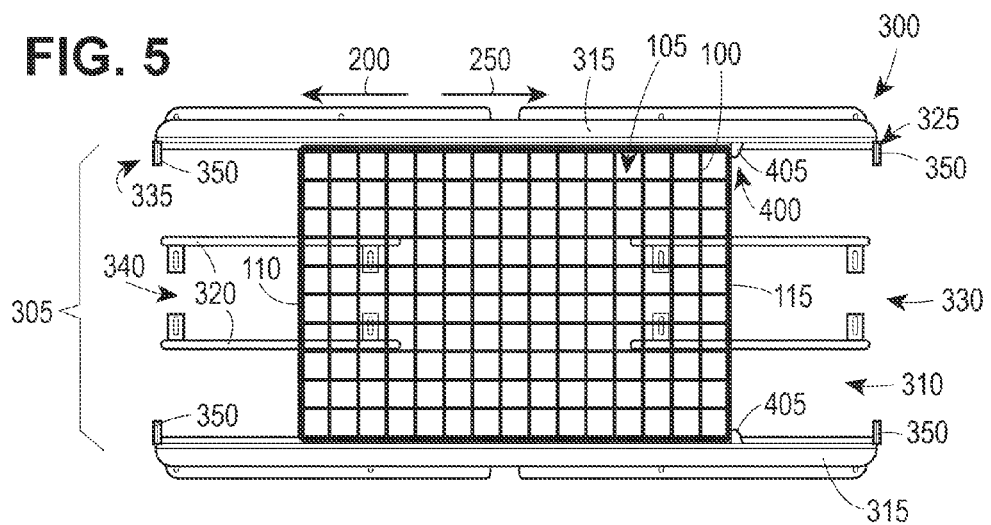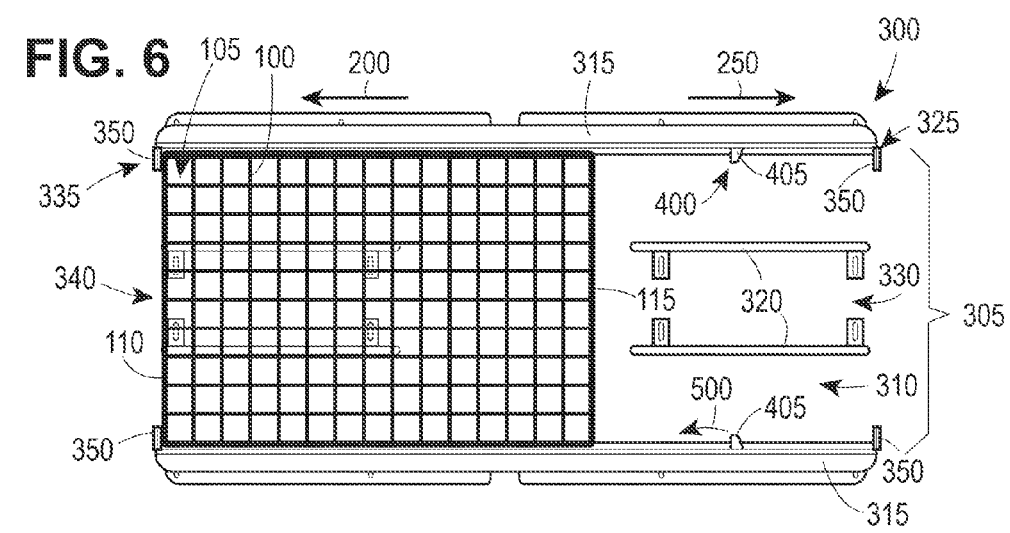

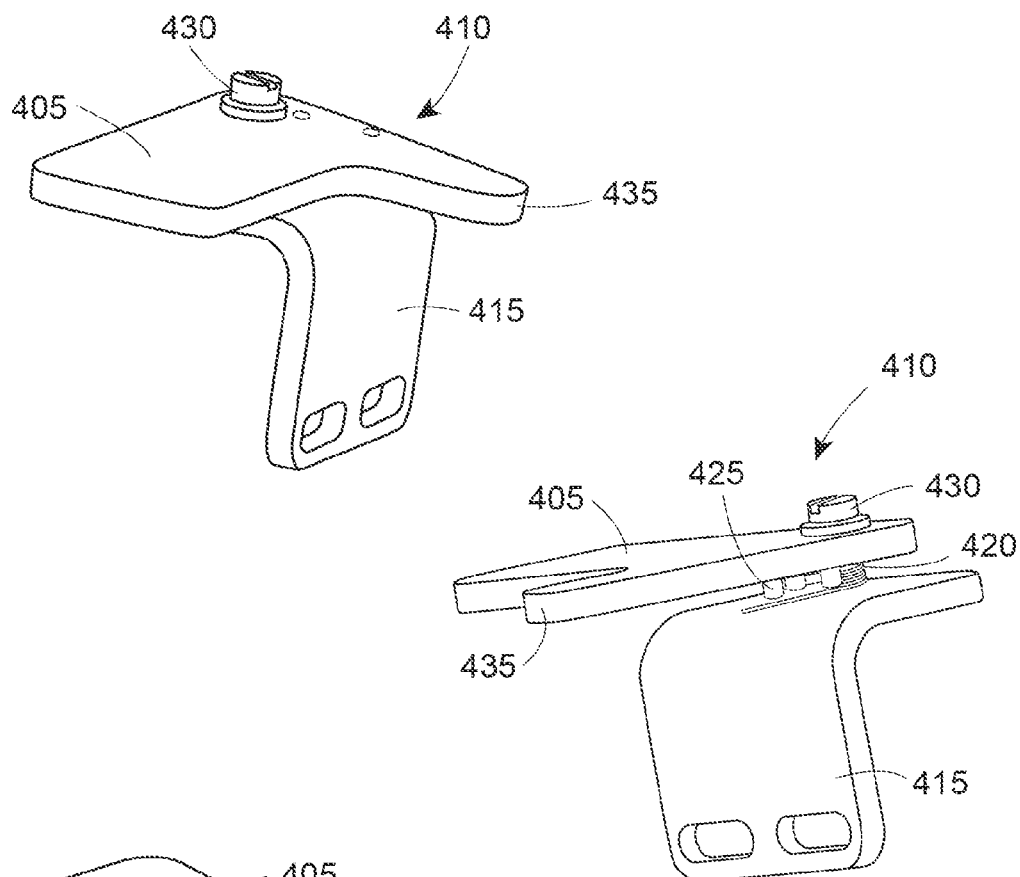
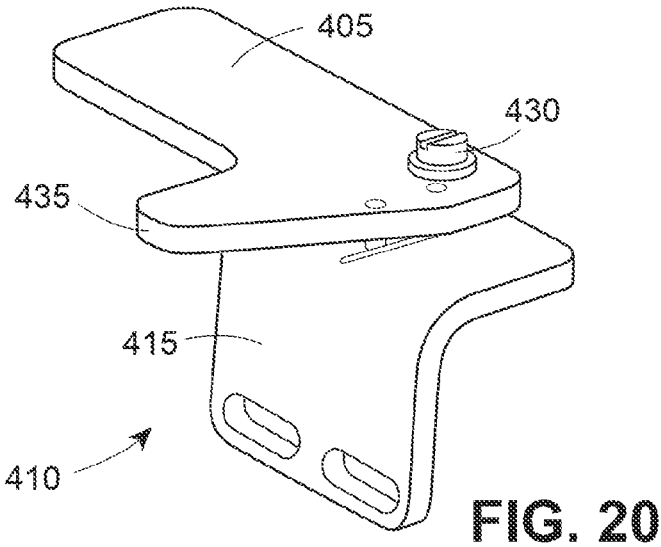
FIG. 18
FIG. 19
FIG. 20

INDEXING SYSTEM FOR AN IN OVO INJECTION APPARATUS, AND ASSOCIATED METHOD

TECHNICAL FIELD

The present disclosure generally relates to in ovo injection of avian eggs. More particularly, the present disclosure relates to an indexing system implemented on a manually operated in ovo injection apparatus, and an associated method.

BACKGROUND

Injections of various substances into avian eggs is commonly referred to as in ovo injection. Such injections have been employed to decrease post-hatch mortality rates, increase the potential growth rates or eventual size of the resulting bird, and even to influence the gender determination of the embryo. Similarly, injections of antigens into live eggs have been employed to incubate various substances used in vaccines which have human or animal medicinal or diagnostic applications. Examples of substances that have been used for, or proposed for, in ovo injection include vaccines, antibiotics and vitamins. In addition, removal of material from avian eggs has been employed for various purposes, such as testing and vaccine harvesting.

An egg injection apparatus (i.e., in ovo injection apparatus) may comprise a plurality of injection devices which operate simultaneously or sequentially to inject a plurality of eggs. The injection apparatus may comprise an injection head which comprises the injection devices, and wherein each injection device is in fluid communication with a source containing a treatment substance to be injected. In ovo injection of substances (as well as in ovo extraction of materials) typically occurs by piercing an egg shell to form an opening (e.g., via a punch), extending an injection needle through the hole and into the interior of the egg (and in some cases into the avian embryo contained therein), and injecting treatment substance(s) through the needle and/or removing material therefrom.

An in ovo injection apparatus conventionally is designed to operate in conjunction with commercial egg carrier carriers or flats. Egg flats utilized in conjunction with an in ovo injection apparatus typically contain an array of pockets that are configured to support a respective plurality of avian eggs in a generally upright orientation. The eggs flats may be typically transported through the in ovo injection apparatus via an automated conveyor system having sensors and other automated control devices for registering the egg flat beneath the injection head for injection of the eggs carried by the egg flat. These control systems present an increased cost for manufacture of an automated in ovo injection apparatus capable of providing high throughput and reduced headcount for operation thereof.

However, in some instances, an automated in ovo injection apparatus may not be practical for use by a customer. Thus, in such instances, a manually operated in ovo injection apparatus without an automated conveyor system for transporting the egg flats through the in ovo injection apparatus may be suitable as an alternative to the automated in ovo injection apparatus. Issues with a manually operated in ovo injection apparatus may arise when an egg flat carries a quantity of eggs greater than the number of injection devices forming the injection head (e.g., an egg flat having 150 pockets and an injection head having 50 injection devices). In this regard, the operator must position the egg flat at multiple injection positions beneath the injection head in order to inject all of the eggs carried by the egg flat. That is, the injection head must be actuated at least more than one time to provide multiple injection events to a single egg flat in some instances. Requiring the operator to manually position the egg flat at multiple injection positions can lead to errors such as, for example, misalignment of the needles and eggs (may lead to bend injection needles, which creates apparatus downtime), missing the eggs entirely (e.g., injecting at interstitial sites between adjacent eggs), and multiple injections of the same eggs.

Accordingly, it would be desirable to provide an indexing system for use with an in ovo injection apparatus lacking an automated conveyor system for transporting eggs flats therethough, so as to ensure proper positioning of egg flats beneath an injection head at multiple injection positions. Furthermore, it would be desirable to provide an associated method that would facilitate high throughput of in ovo injections implemented by an in ovo injection apparatus lacking an automated conveyor system for transporting eggs flats therethough, while reducing operator errors associated therewith.

BRIEF SUMMARY

The above and other needs are met by embodiments of the present disclosure which, according to one aspect, provides an in ovo injection apparatus capable of injecting a plurality of avian eggs carried by an egg carrier having a leading end and a trailing end. The apparatus comprises an injection assembly having a plurality of injection devices, each injection device being configured to inject a respective avian egg when in alignment therewith. The apparatus further comprises an indexing system configured to provide a positioning scheme for an egg carrier carrying a plurality of avian eggs to the injection assembly for injection thereof. The indexing system includes an initial stop configured to abut the trailing end of the egg carrier to form a first egg carrier position such that a first subset of the plurality of avian eggs is in alignment with the respective injection devices for injection thereof. An intermediate stop is configured to abut the trailing end of the egg carrier to form a second egg carrier position such that a second subset of the plurality of avian eggs is in alignment with the respective injection devices for injection thereof.

Another aspect provides a method of advancing an egg carrier through an in ovo injection apparatus for injection of a plurality of avian eggs carried by the egg carrier. The method comprises engaging an egg carrier with an indexing system of an in ovo injection apparatus, the egg carrier having a leading end and a trailing end. The method further comprises abutting the trailing end of the egg carrier against an initial stop of the indexing system. The method further comprises injecting a first subset of the plurality of avian eggs via an injection assembly of the in ovo injection apparatus. The method further comprises advancing the egg carrier along a carrier slide path defined by the indexing system such that the leading end of the egg carrier interacts with a pivot abutment member projecting into the carrier slide path so as to rotate the pivot abutment member out of the carrier slide path, thereby allowing the egg carrier to move therepast. The pivot abutment member is biased to rotate back into the carrier slide path after the trailing end of the egg carrier moves therepast so as to form an intermediate stop of the indexing system. The method further comprises abutting the trailing end of the egg carrier against the intermediate stop. The method further comprises injecting a second subset of the plurality of avian eggs via the injection assembly.

Yet another aspect provides an in ovo injection apparatus capable of injecting a plurality of avian eggs carried by an egg carrier having a leading end and a trailing end. The apparatus comprises an injection assembly having a plurality of injection devices, each injection device being configured to inject a respective avian egg when in alignment therewith. The apparatus further comprises an indexing system configured to provide a positioning scheme for an egg carrier carrying a plurality of avian eggs to the injection assembly for injection thereof. The indexing system includes a carrier slide frame forming a carrier slide path, and a pivotable stop device having a pivot abutment member projecting into the carrier slide path such that a leading end of the egg carrier is capable of interacting with and rotating the pivot abutment member out of the carrier slide path, thereby allowing the egg carrier to move therepast. The pivot abutment member is biased to rotate back into the carrier slide path after a trailing end of the egg carrier moves therepast.

Thus, various aspects of the present disclosure provide advantages, as otherwise detailed herein.

BRIEF DESCRIPTION OF THE DRAWINGS

Figure 1:
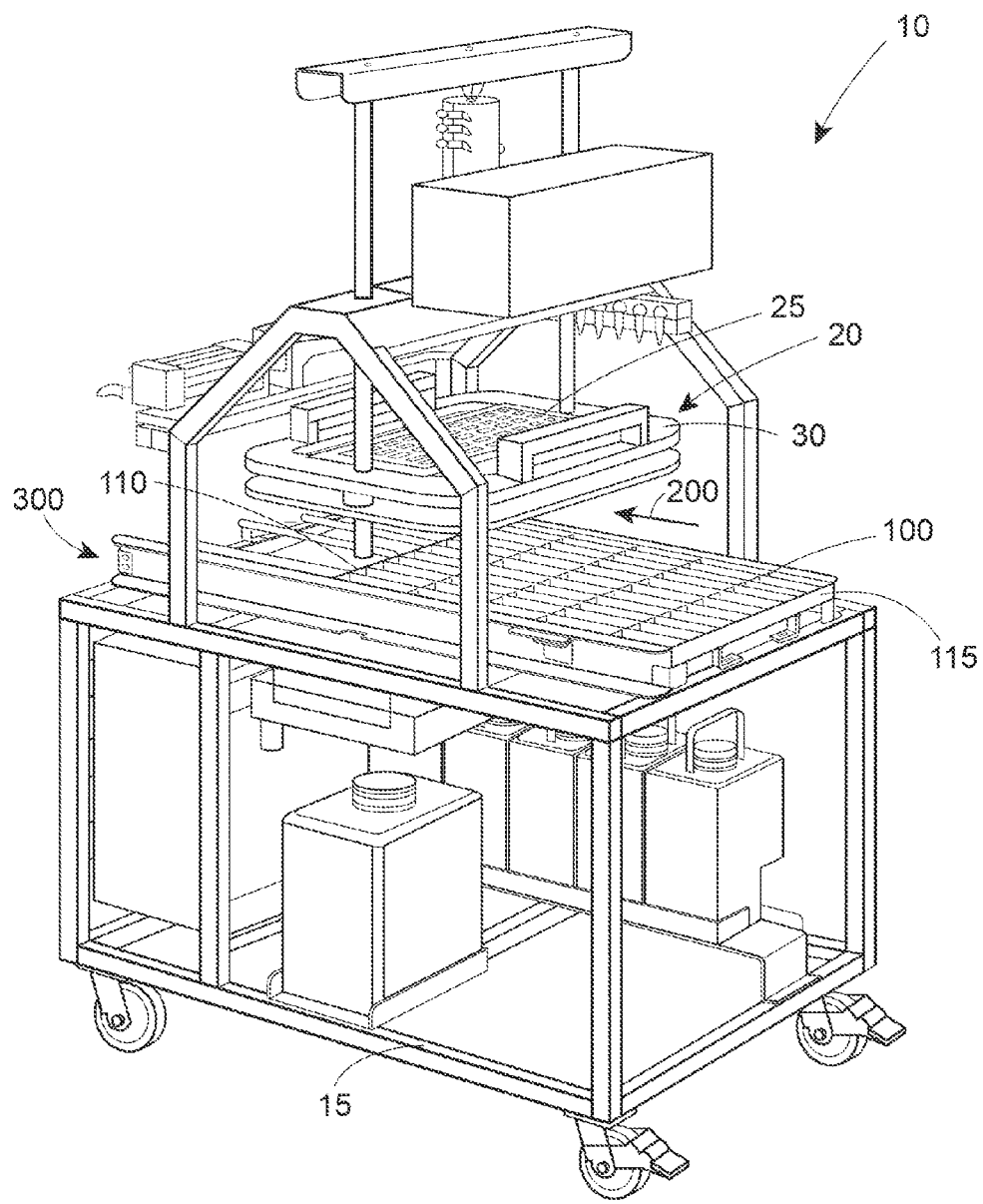
Figure 2:
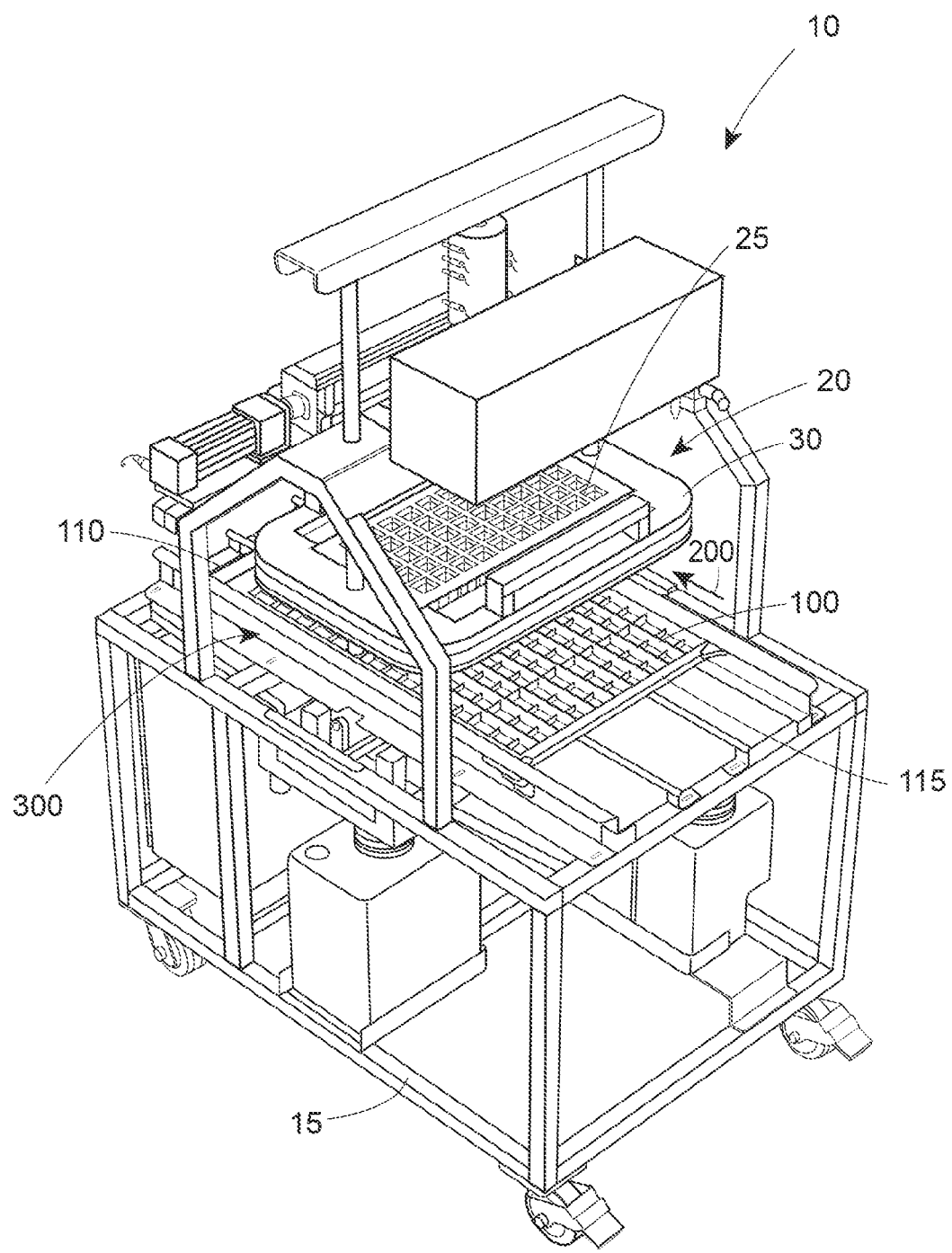
Figure 3:
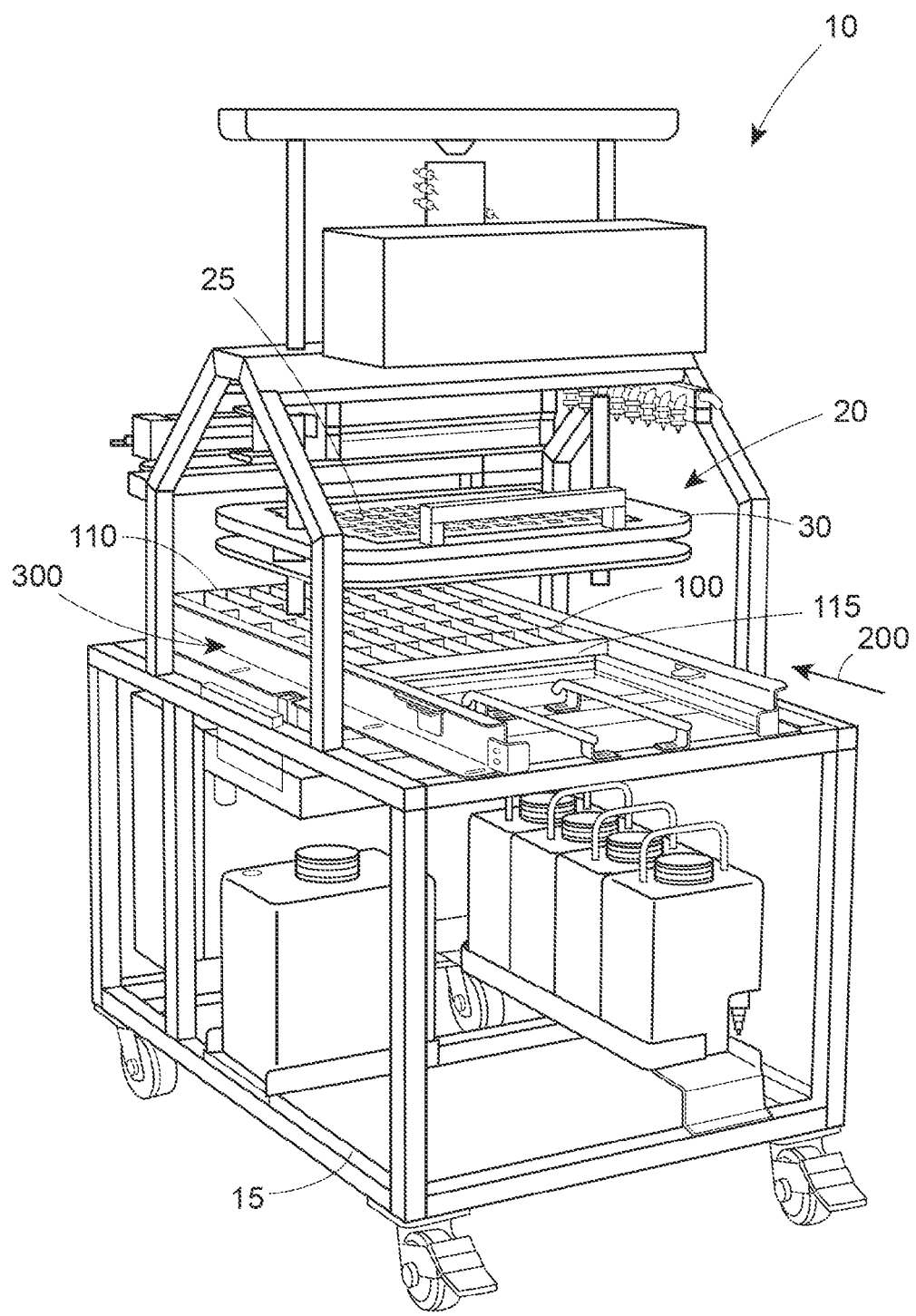
Figure 7:
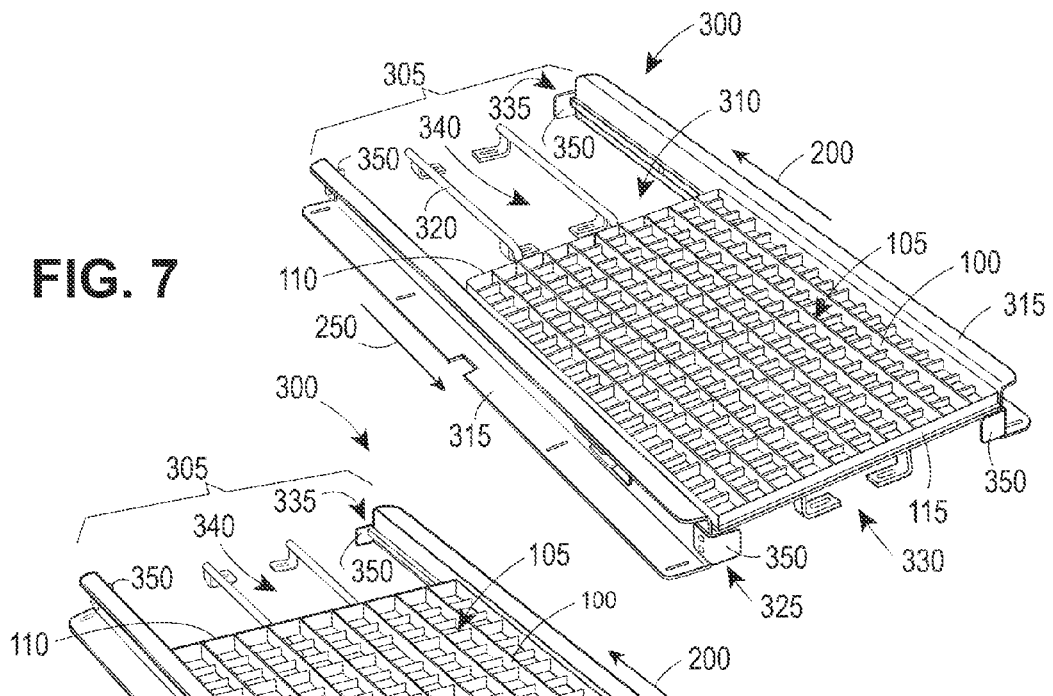
Figure 8:
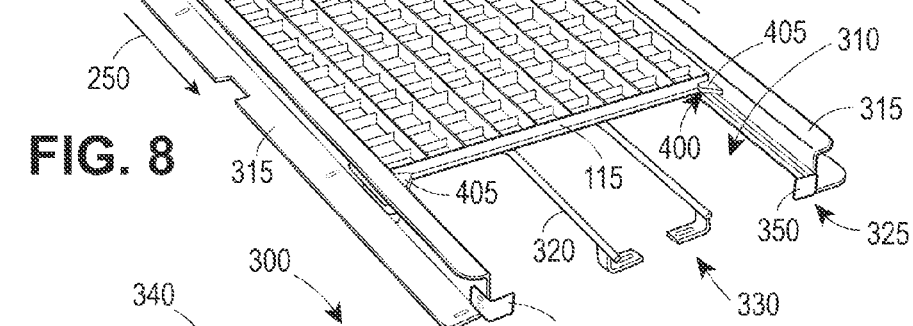
Figure 9:
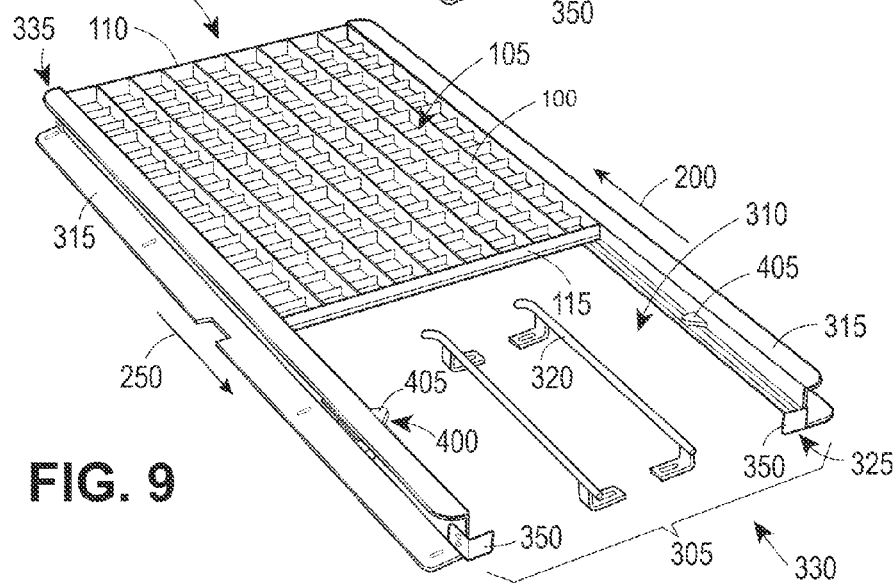
Figure 10:
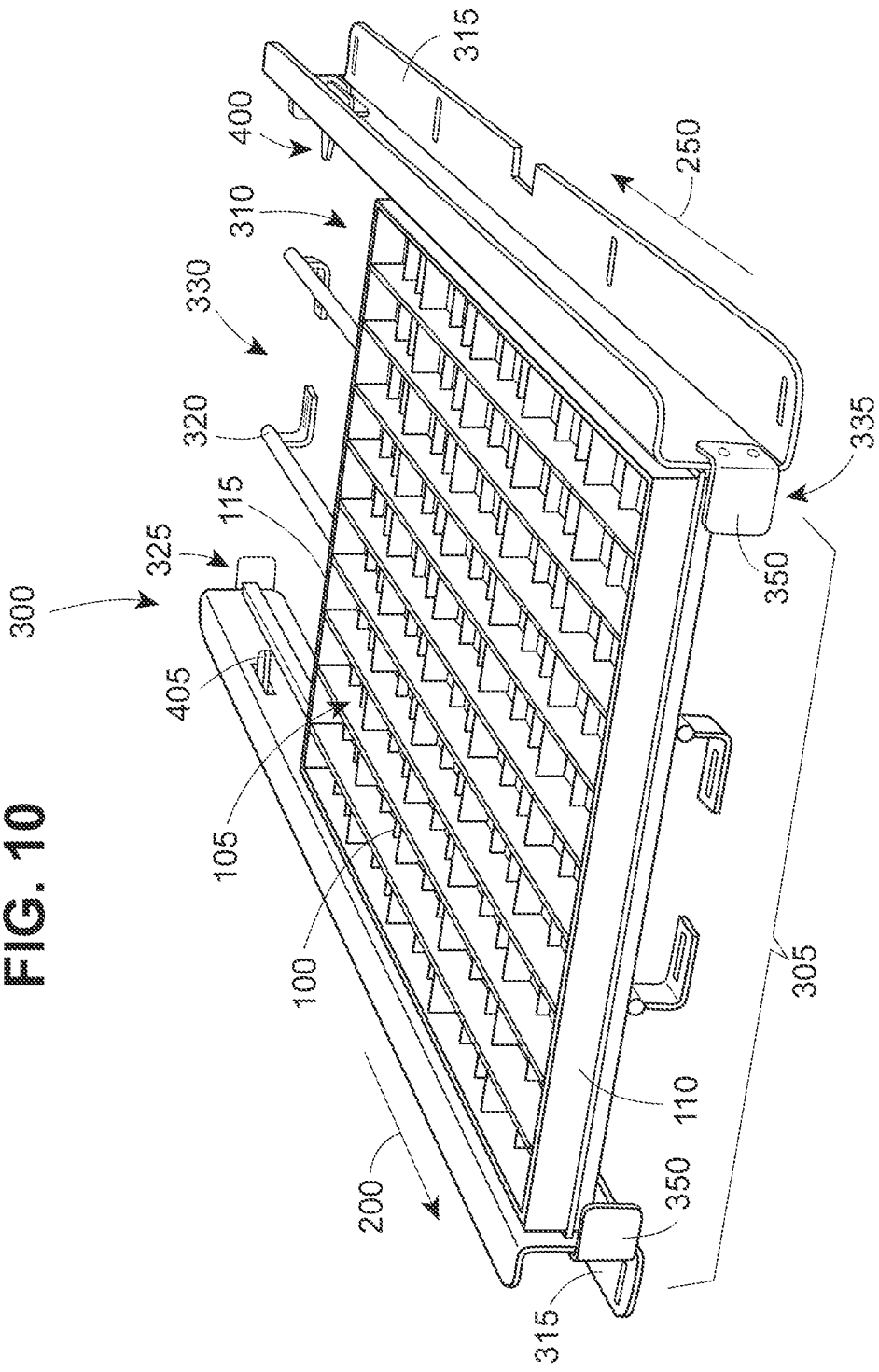
Figure 11:
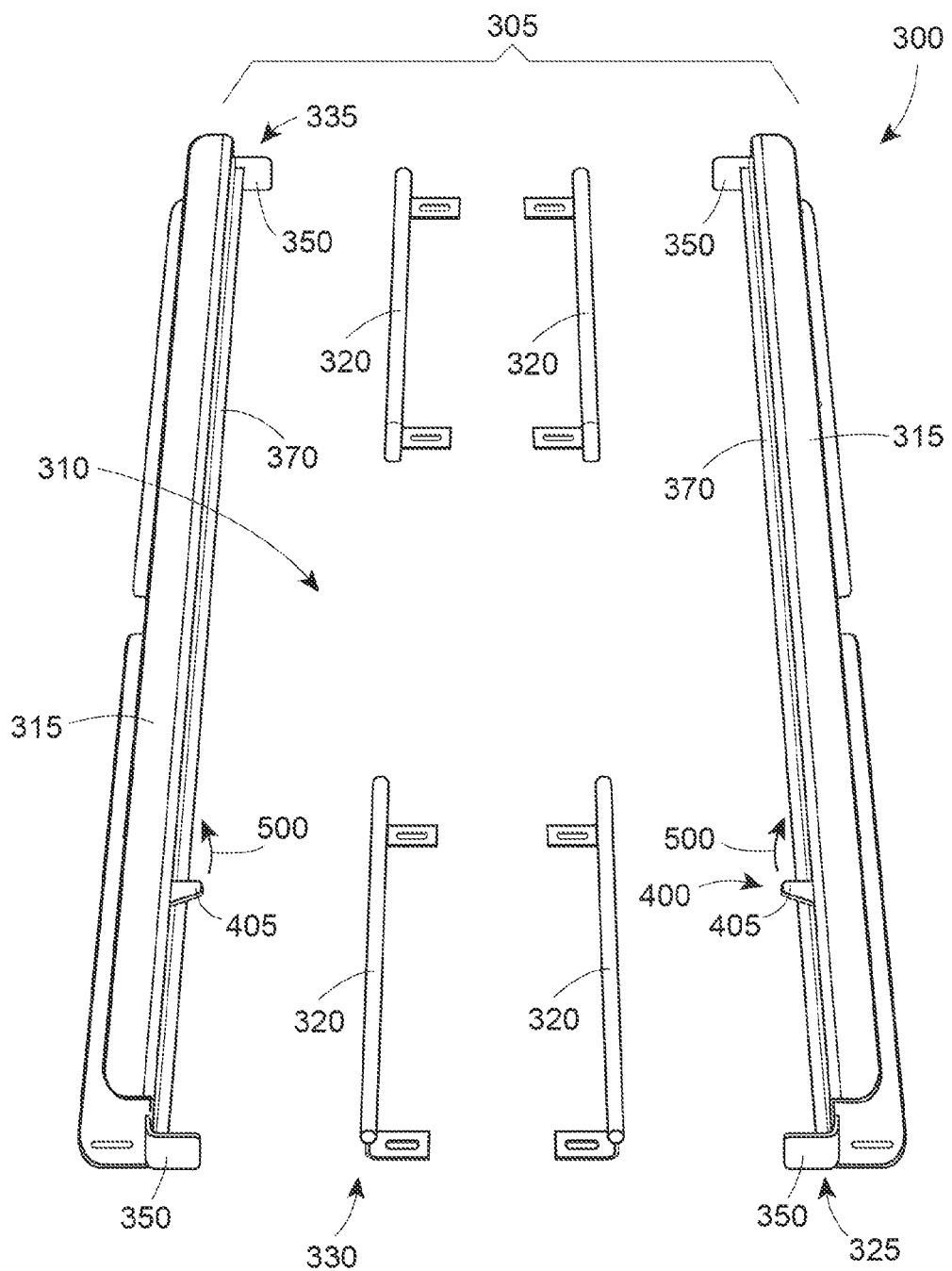
Figure 12:
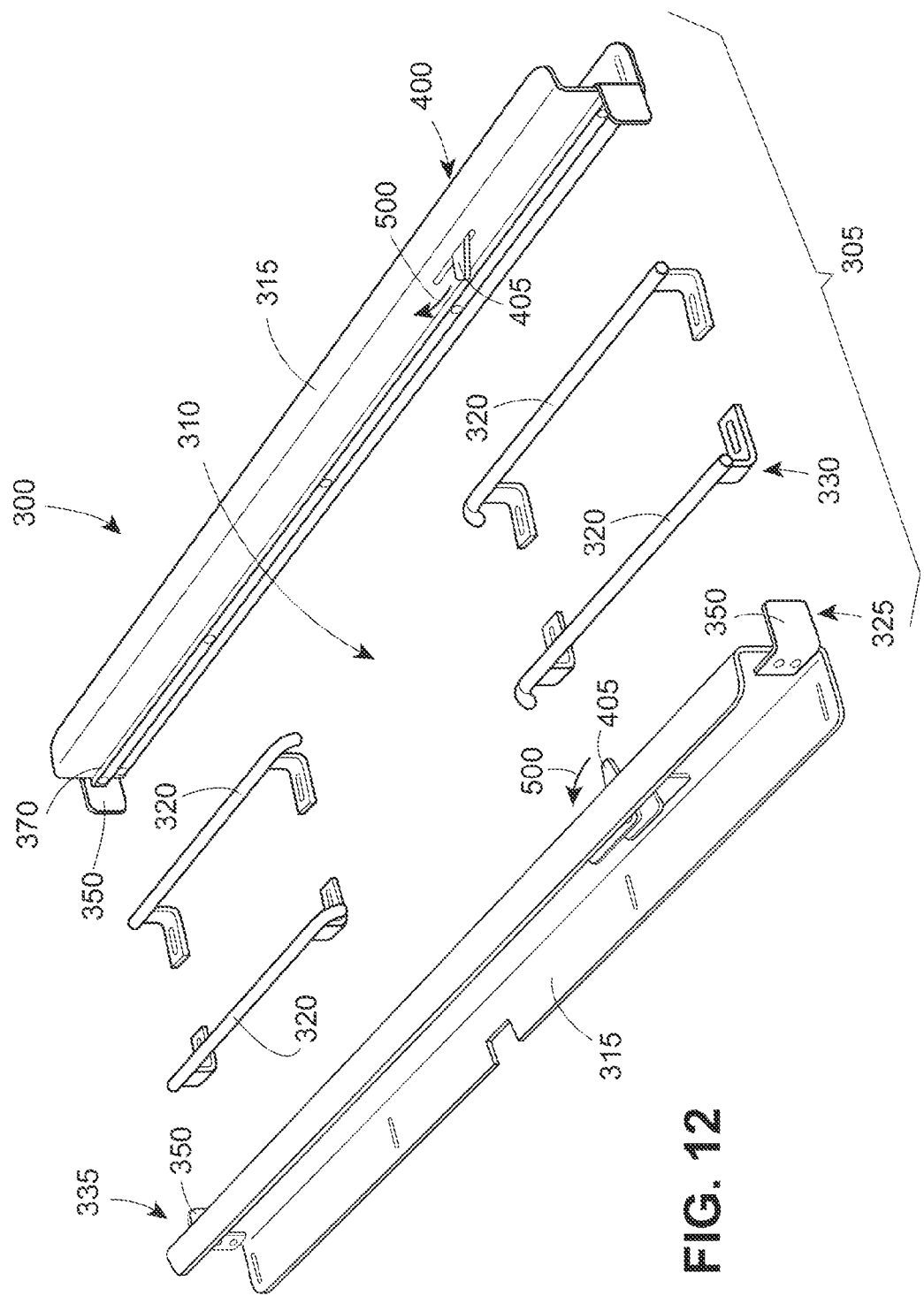
Figure 13:
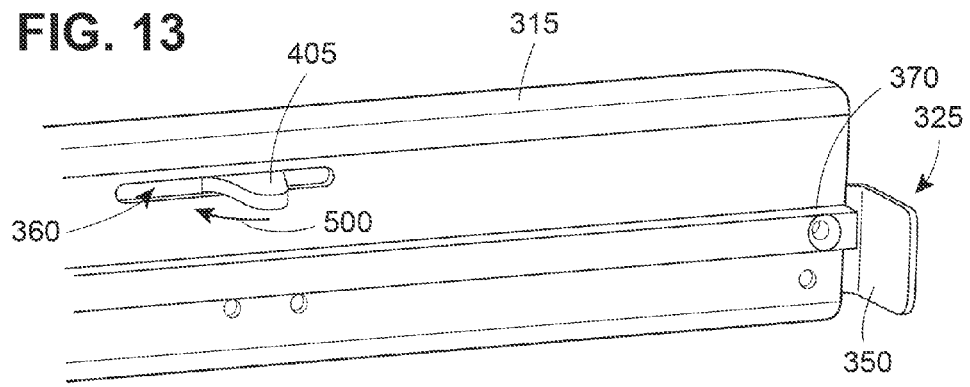
Figure 14:
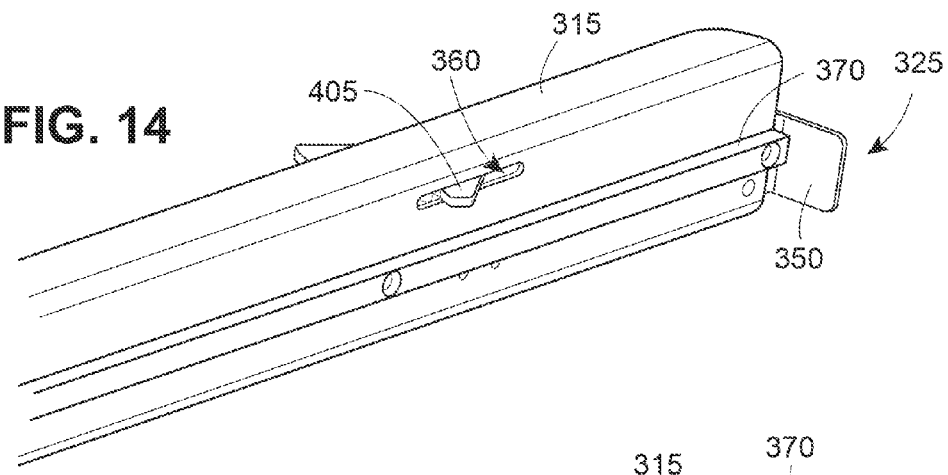
Figure 15:
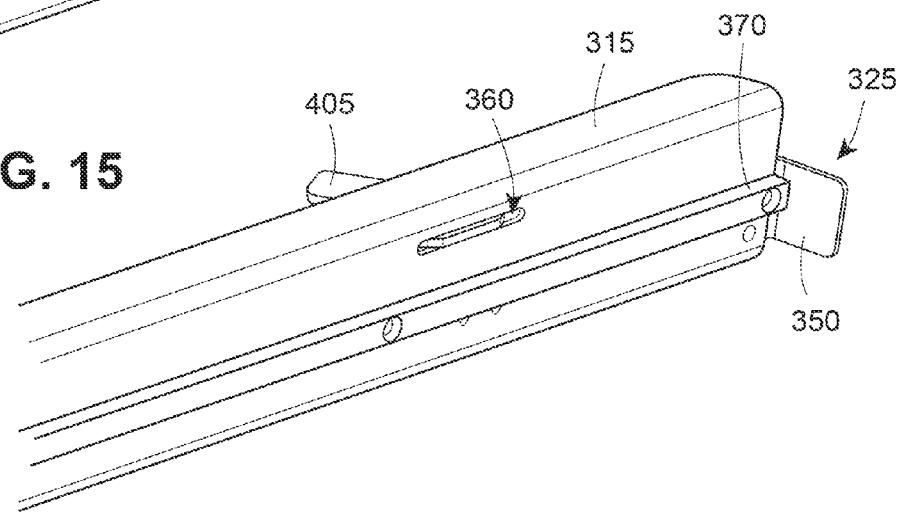
Figure 16:
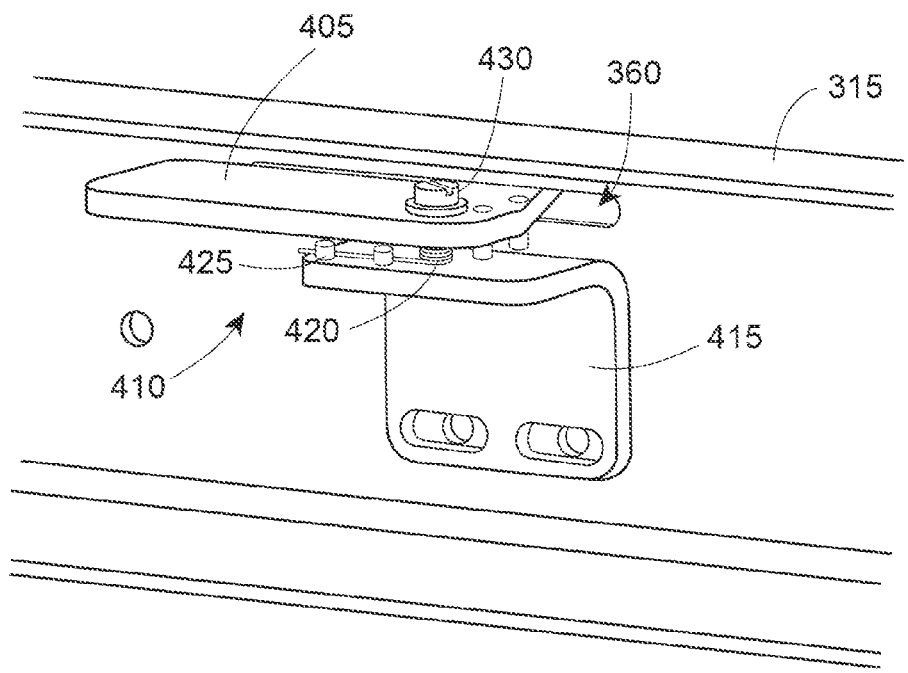
Figure 17:
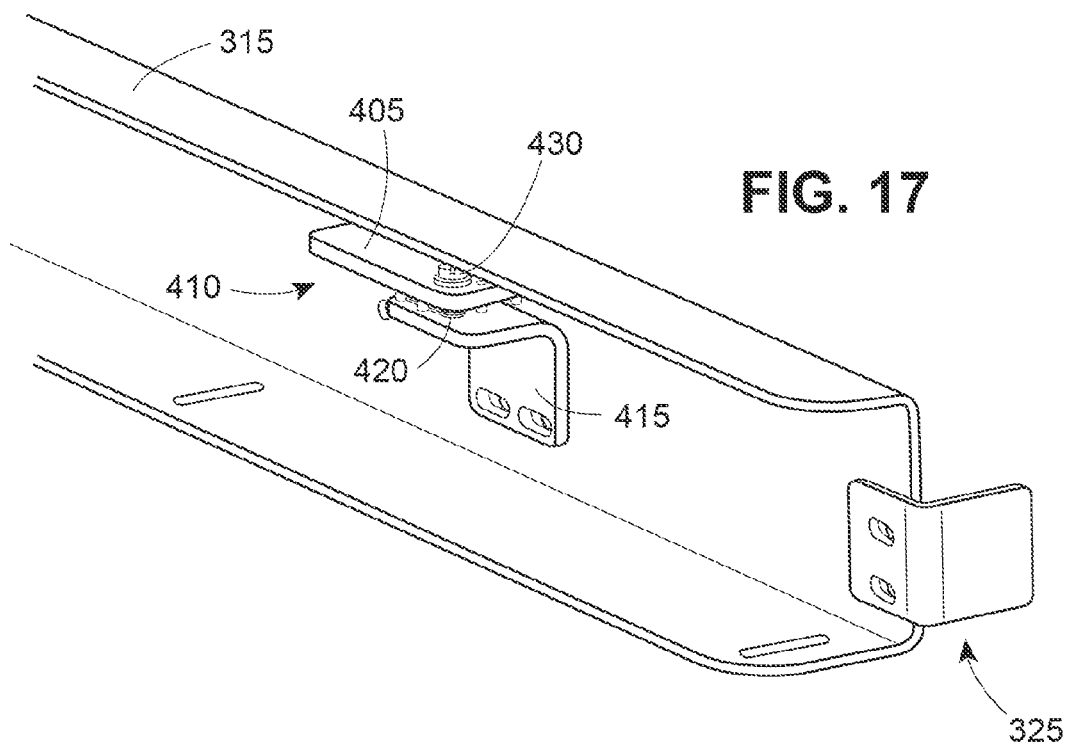
Figure 21:
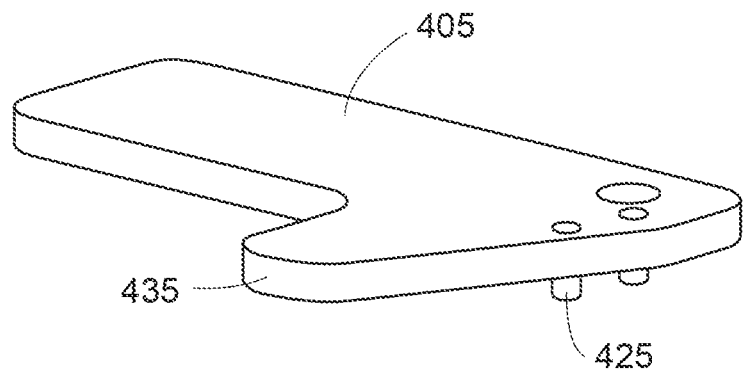
Figure 22:
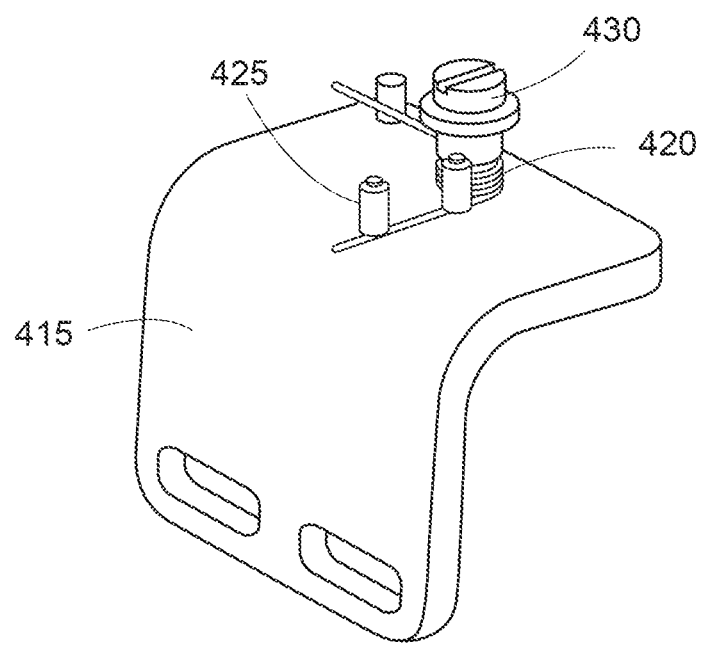

Having thus described various embodiments of the present disclosure in general terms, reference will now be made to the accompanying drawings, which are not necessarily drawn to scale, and wherein:

FIG. 1 is a schematic perspective view of an in ovo injection apparatus with an egg carrier positioned at an initial injection position by an indexing system, according to one aspect of the present disclosure;

FIG. 2 is a schematic perspective view of an in ovo injection apparatus with an egg carrier positioned at an intermediate injection position by an indexing system, according to one aspect of the present disclosure;

FIG. 3 is a schematic perspective view of an in ovo injection apparatus with an egg carrier positioned at a terminal injection position by an indexing system, according to one aspect of the present disclosure;

FIG. 4 is a schematic plan view of a carrier slide frame with an egg carrier abutting an initial stop of an indexing system for an in ovo injection apparatus, according to one aspect of the present disclosure;

FIG. 5 is a schematic plan view of a carrier slide frame with an egg carrier abutting an intermediate stop of an indexing system for an in ovo injection apparatus, according to one aspect of the present disclosure;

FIG. 6 is a schematic plan view of a carrier slide frame with an egg carrier abutting a terminal stop of an indexing system for an in ovo injection apparatus, according to one aspect of the present disclosure;

FIG. 7 is a schematic perspective view of a carrier slide frame with an egg carrier abutting an initial stop of an indexing system for an in ovo injection apparatus, according to one aspect of the present disclosure;

FIG. 8 is a schematic perspective view of a carrier slide frame with an egg carrier abutting an intermediate stop of an indexing system for an in ovo injection apparatus, according to one aspect of the present disclosure;

FIG. 9 is a schematic perspective view of a carrier slide frame with an egg carrier abutting a terminal stop of an indexing system for an in ovo injection apparatus, according to one aspect of the present disclosure;

FIG. 10 is another schematic perspective view of a carrier slide frame with an egg carrier abutting a terminal stop of an indexing system for an in ovo injection apparatus, according to one aspect of the present disclosure;

FIGS. 11 and 12 are perspective views of a carrier slide frame of an indexing system for an in ovo injection apparatus, according to one aspect of the present disclosure;

FIG. 13 is a partial schematic view of an indexing system implementing a pivotable stop device having a pivot abutment member shown in a fully projected position, according to one aspect of the present disclosure;

FIG. 14 is a partial schematic view of an indexing system implementing a pivotable stop device having a pivot abutment member shown in a partially refracted position, according to one aspect of the present disclosure;

FIG. 15 is a partial schematic view of an indexing system implementing a pivotable stop device having a pivot abutment member shown in a fully retracted position, according to one aspect of the present disclosure;

FIGS. 16 and 17 are partial schematic views of an indexing system for an in ovo injection apparatus, according to one aspect of the present disclosure;

FIGS. 18-20 are schematic perspective views of a pivot device of an indexing system for an in ovo injection apparatus, according to one aspect of the present disclosure;

FIG. 21 is a schematic perspective view of a pivot abutment member of a pivotable stop device implemented in an indexing system for an in ovo injection apparatus, according to one aspect of the present disclosure; and FIG. 22 is a schematic perspective view of a base member and a biasing member operably engaged therewith of a pivotable stop device implemented in an indexing system for an in ovo injection apparatus, according to one aspect of the present disclosure.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

An in ovo injection apparatus 10 is illustrated in FIGS. 1-3. The illustrated apparatus 10 includes a frame 15 and an injection assembly 20 movably attached thereto. The injection assembly 20 includes a plurality of injection devices 25 having needles associated therewith in accordance with known techniques for delivering a substance to avian eggs. The injection devices 25 may be arranged to form an injection head 30 capable of moving in a substantially vertical direction to inject avian eggs positioned therebeneath after being transported in a direction substantially perpendicular to the vertical direction of travel of the injection head 30. The illustrated injection head 30 includes fifty (50) injection devices 25. In ovo injection of substances (as well as in ovo extraction of materials) typically occurs by piercing an egg shell to form an opening (e.g., via a punch), extending an injection needle through the hole and into the interior of the egg (and in some cases into the avian embryo contained therein), and injecting treatment substance(s) through the needle and/or removing material therefrom.

The apparatus 10 may be configured to receive an egg carrier (e.g., an egg flat) 100 that supports avian eggs for transport. The illustrated egg carrier 100 is configured to hold a plurality of avian eggs in a substantially upright position so as to provide external access to predetermined areas of the eggs. Specifically, each egg can be contacted by the injection devices 25 from above the egg carrier 100. Each egg is held by the egg carrier 100 so that a respective end thereof is in proper alignment relative to a corresponding one of the injection devices 25. The egg carrier 100 may include an array of receptacles 105 configured to support a respective plurality of eggs in a generally upright orientation, as shown in FIGS. 4-10. The illustrated egg carrier 100 includes a plurality of rows of receptacles 105. Each receptacle 105 may be configured to receive one end of a respective egg so as to support the egg in a substantially vertical position. The illustrated egg carrier 100 is capable of carrying one hundred and fifty (150) eggs. The egg carrier 100 may include a leading end 110, a trailing end 115, and a pair of sides cooperating to form a generally rectangular structure. However, the egg carrier 100 may have any size, shape or dimensions and modifications of the present disclosure may be configured to accommodate such variations. The leading end 110 of the egg carrier 100 is the portion thereof that first moves beneath the injection head 30 with respect to the trailing end 115 when the egg carrier advances in a first direction 200. The trailing end is the last portion of the egg carrier 100 to pass beneath the injection head 30 when the egg carrier 100 is advanced in the first direction 200.

As previously described, in some instances, a single egg carrier 100 may include an amount of receptacles 105 greater than the number of injection devices 25 provided on the injection head 30. For example, as illustrated in FIGS. 1-3, the egg carrier 100 includes one hundred and fifty (150) receptacles, while the injection head 30 includes fifty (50) injection devices 25. In such instances, the quantity of eggs carried and transported by the single egg carrier 100 is also greater than the number of injection devices 25 provided on the injection head 30. As such, for this particular example, the injection head 30 would need to interact with the egg carrier 100 three times (i.e., three injection events) in order to have each egg within the egg carrier 100 injected with a substance, assuming each receptacle 105 contained an egg. In this regard, the egg carrier 100 would need to be moved to three different positions beneath the injection head 30 such that each egg in the egg carrier 100 is injected, and only injected once. This three position scheme is illustrated in FIGS. 1-3 for the entire in ovo injection apparatus 10, while FIGS. 4-9 illustrate the same three position scheme by depicting only a portion of the apparatus 10. While the present disclosure refers to a three position scheme, it will be understood that the disclosure is not limited to such and that any number of injection positions can be determined as dependent upon the number of receptacles 105 forming the egg carrier 100 and the number of injection devices 25. As previously mentioned, injection errors may occur when the multiple injection positioning of the egg carrier 100 is performed manually by an operator. That is, errors such as misalignment of the needles and eggs (may lead to bent injection needles, which creates apparatus downtime), missing the eggs entirely (e.g., injecting at interstitial sites between adjacent eggs), and multiple injections of the same eggs can occur.

Accordingly, the present disclosure provides an indexing system 300 capable of reducing operator errors associated with manually advancing the egg carrier 100 through the apparatus 10 for multiple injection events of a single egg carrier 100 by ensuring consistently proper advancement and positioning of the egg carrier 100 beneath the injection head 30 for egg carriers 100 requiring multiple injection positions. In other words, the indexing system 300 may be configured to provide a positioning scheme for positioning the egg carrier 100 at appropriate injection positions during advancement thereof through the apparatus 10, as shown in FIGS. 1-9. For example, assuming an injection head 30 of fifty (50) injection devices 25 and an egg carrier 100 of one hundred and fifty (150) receptacles 105, the egg carrier 100 may be initially positioned at an initial injection position for injection of a first subset of eggs carried by the egg carrier 100 (e.g., five rows of eggs (fifty eggs) starting from the leading end 110 of the egg carrier 100), as illustrated in FIGS. 1, 4 and 7. The egg carrier 100 may then be manually advanced to an intermediate injection position for injection of a second subset of eggs (the next five rows of eggs (fifty eggs)), as illustrated in FIGS. 2, 5 and 8. Finally, the egg carrier 100 may then be manually advanced to a terminal injection position for injection of a third subset of eggs (the last five rows of eggs (fifty eggs)), as illustrated in FIGS. 3, 6 and 9. As previously mentioned, there may be any number of injection positions as dependent upon the number of injection devices 25 and the number of receptacles 105 provided.

In order to create the positioning scheme, the indexing system 300 may include a plurality of stops for limiting movement of the egg carrier 100 in a given direction, thereby allowing the operator to consistently position the egg carrier 100 manually in the appropriate injections positions for the series of injection events when advancing the egg carrier 100 through the apparatus 10. According to one aspect of the present disclosure, the indexing system 300 may include a carrier slide frame 305 fixed, connected, or attached to (or otherwise operably engaged with) the frame 15. The carrier slide frame 305 may be configured to receive and constrain the egg carrier 100 therewithin such that the egg carrier 100 may be manually slid by an operator along the carrier slide frame 305 through the apparatus 10. A carrier slide path 310 may be defined by the carrier slide frame 305, wherein the egg carrier 100 moves along the carrier slide path 310 from the initial injection position to the final injection position, regardless of the number of intermediate injection positions. According to one aspect, the carrier slide frame 305 may include a pair of side rails 315 for laterally constraining the egg carrier 100 and a plurality of support rails 320 for supporting a bottom of the egg carrier 100 and limiting the twisting action of the egg carrier 100 within the carrier slide path 310, as shown in FIGS. 11 and 12. Each side rail 315 may include a lip 370 on which the bottom portion of the egg carrier 100 sits when positioned within the carrier slide frame 305. That is, the sides of the eggs carrier 100 may engage the lips 370 so as to provide a sliding contact portion.

An initial stop 325 may be provided or otherwise positioned at a first end 330 of the carrier slide frame 305 so as to limit travel of the egg carrier 100 in a second direction 250 opposite the first direction 200, thus creating the initial injection position. As shown in FIGS. 4 and 7, the trailing end 115 of the egg carrier 100 abuts the initial stop 325 such that the egg carrier 100 cannot be advanced in the second direction 250. In this manner, the operator may be assured that the egg carrier 100 is in the appropriate position for an initial injection event to inject the first subset of eggs.

Similarly, a terminal stop 335 may be provided or otherwise positioned at a second end 340 of the carrier slide frame 305 so as to limit travel of the egg carrier 100 in the first direction 200, thus creating the terminal injection position. As shown in FIGS. 6 and 9, the leading end 110 of the egg carrier 100 abuts the terminal stop 335 such that the egg carrier 100 cannot be advanced in the first direction 200. In this manner, the operator may be assured that the egg carrier 100 is in the appropriate position for a terminal injection event to inject the third subset of eggs.

The initial and terminal stops 325, 335 may include one or more abutment members 350 extending into the carrier slide path 310 to restrict advancement of the egg carrier 100 in the respective first or second direction 200, 250. According to one aspect, each of the initial and terminal stops 325, 335 may include a pair of the abutment members 350 opposably positioned on the side rails 315, as shown in FIGS. 11 and 12. In some instances, the abutment members 350 of the initial and/or terminal stops 325, 335 may be fixedly engaged with the side rails 315. For example, each of the abutment members 350 may comprise a 90° bracket fixedly attached to one of the side rails 315 such that a portion thereof extends outward from the side rail 315 in a substantially perpendicular orientation with respect to a major vertical plane defined by the side rail 315. In other instances, the abutment members 350 may be movably engaged with the carrier slide frame 305.

According to aspects of the present disclosure, the indexing system 300 may include at least one intermediate stop 400. Each intermediate stop 400 may be used to create an intermediate injection position between the initial and terminal injection positions. The intermediate stop 400 may be provided or otherwise positioned between the first and second ends 330, 340 of the carrier slide frame 305 so as to limit travel of the egg carrier 100 in the second direction 250, thus creating the intermediate injection position. As shown in FIGS. 5 and 8, the trailing end 115 of the egg carrier 100 abuts the intermediate stop 400 such that the egg carrier 100 cannot be advanced in the second direction 250. In this manner, the operator may be assured that the egg carrier 100 is in the appropriate position for an intermediate injection event to inject the second subset of eggs.

As shown in FIGS. 13-15, according to some aspects of the present disclosure, the intermediate stop 400 may include a pivot abutment member 405 extending into the carrier slide path 310. In this regard, the pivot abutment member 405 may be configured to pivot out of the carrier slide path 310 along an arcuate pivot path 500 to a fully retracted position when interacting with the egg carrier 100 being advanced in the first direction 200, as shown in FIGS. 4, 7 and 15 (without egg carrier 100). The pivot abutment member 405 may be further configured to lock in the carrier slide path 310 in a non-pivoting manner at a fully projected position when interacting with the egg carrier 10 moving in the second direction 250, once the trailing end 115 of the egg carrier 100 has moved past the intermediate stop 400, as shown in FIGS. 5, 8 and 13 (without egg carrier 100). In this manner, the egg carrier 100 may be restricted from moving in the second direction 250 once moving past the intermediate stop 400, thereby providing the abutment for creating the intermediate injection position. FIG. 14 illustrates the pivot abutment member 405 in a partially retracted position.

According to an aspect of the present disclosure, the intermediate stop 400 may include a pivotable stop device 410 of which the pivot abutment member 405 forms a portion thereof, as shown in FIGS. 18-22. In some instances, the pivotable stop device 410 may include a base member 415 operably engaged with the pivot abutment member 405 and capable of being fixed, attached, or otherwise connected to the carrier slide frame 305 (e.g., the side rails 315), as shown in FIGS. 16 and 17. The pivotable stop device 410 may include a biasing member 420 (e.g., a spring) for creating the pivoting mechanism associated therewith, as shown in FIGS. 16, 19 and 22. In this regard, the pivot abutment member 405, the biasing member 420, and the base member 415 may be assembled in a manner that creates a pivoting action capable of being implemented in accordance with the present disclosure so as to facilitate the intermediate stop 400 and the associated intermediate injection position. In some instances, one or more spacers 425 may be used to create spacing between the base member 415 and the pivot abutment member 405, to allow for the biasing member 420. An appropriate fastener 430 may be provided to couple the base member 415 and the pivot abutment member 405. The pivot abutment member 405 may include a projecting portion 435 configured to extend into the carrier slide path 310 through a slot 360 defined by the side rails 315. The pivot abutment member 405 may be configured such that pivoting thereof may occur in the first direction 200, but not in the second direction 250. That is, the pivot abutment member 405 may be restricted from pivoting along an arcuate path opposite that of the arcuate pivot path 500, to provide the previously described stop mechanism.

In some instances, in order to position the egg carrier 100 in the initial injection position, the leading end 110 of the egg carrier 100 may interact with the intermediate stop 400 so as to allow the egg carrier 100 to be positioned within the carrier slide path 310. In the illustrated embodiment, the egg carrier 100 may be inserted at an angle with respect to the carrier slide path 310 such that the leading end 110 is first positioned in the carrier slide frame 305 between the initial stop 325 and the intermediate stop 400. The leading end 110 may then be advanced to interact with the intermediate stop 400 so as to pivot the pivot abutment member 405 out of the carrier slide path 310 such that the egg carrier 100 may be fully received within the carrier slide frame 305 by lowering the trailing end 115 into the carrier slide path 310, as shown in FIG. 4. The operator may then move the egg carrier 100 in the second direction 250 such that the trailing end 115 abuts the initial stop 325, thereby ensuring the correct positioning of the egg carrier 100 for the initial injection event. After the initial injection event, the operator may advance the trailing end 115 past the intermediate stop 400 in the first direction 200 such that the pivot abutment member 405 pivots into the carrier slide path 310 to its locked position. The operator may then move the egg carrier 100 in the second direction 250 such that the trailing end 115 abuts the intermediate stop 400 (i.e., pivot abutment member 405), thereby ensuring the correct positioning of the egg carrier 100 for the intermediate injection event. After the intermediate injection event, the operator may advance the egg carrier 100 such that the leading end 110 abuts the terminal stop 335, thereby ensuring the correct positioning of the egg carrier 100 for the terminal injection event. After the terminal injection event, the operator or a coworker may remove the egg carrier 100 from the carrier slide frame 305 and the apparatus 10.

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. For example, it will be understood that more than one pivotable stop device 410 may be implemented as part of the indexing system 300 such that multiple intermediate injection positions may be provided. In addition, the intermediate stop 400 may, in some instances, actually create a final or terminal stop position. That is, in some instances, only two injection events may be needed for the egg carrier 100 such that only two injection positions are needed to entirely inject the eggs carried by the egg carrier 100. In such instances, the initial stop 325 may provide a first stop for the egg carrier 100, as previously described, while the intermediate stop 325 forms or otherwise provides a second or final stop. In this regard, the term "intermediate" as referring to the stops is not limited to only providing a stop or stop position disposed between the initial stop 325 and the terminal stop 335. According to such aspects, the terminal stop 335 may not be present or otherwise provided on such apparatuses 10. Furthermore, the present disclosure refers to injection into the avian eggs, but may also include extraction of a substance from the eggs. In this manner, the indexing system 300 may operate in the same or a similar manner as previously described so as to position the avian eggs for substance extraction. Although specific terms are employed herein, they are used in a generic and descriptive sense only and not for purposes of limitation.

That which is claimed:

1. An in ovo injection apparatus capable of injecting a plurality of avian eggs carried by an egg carrier having a leading end and a trailing end, the apparatus comprising:
    an injection assembly having a plurality of injection devices, each injection device being configured to inject a respective avian egg when in alignment therewith; and
    an indexing system configured to provide a manual positioning scheme for an egg carrier carrying a plurality of avian eggs to the injection assembly for injection thereof, the indexing system comprising:
        a carrier slide frame defining a carrier slide path and being configured to receive and constrain the egg carrier carrying the plurality of avian eggs;
        an initial stop configured to abut the trailing end of the egg carrier to form an initial egg carrier position such that a first subset of the plurality of avian eggs is in alignment with the respective injection device for injection thereof, the initial stop comprising an abutment member fixedly positioned at a forward end of the carrier slide frame; and
        an intermediate stop configured to abut the trailing end of the egg carrier to form an intermediate egg carrier position such that a second subset of the plurality of avian eggs is in alignment with the respective injection devices for injection thereof, the intermediate stop comprising a pivot stop device having a pivot abutment member pivotable with respect to the carrier slide frame, the pivot abutment member being biased with a biasing member toward the carrier slide path and configured to pivot out of the carrier slide path so as to allow the egg carrier to interact therewith and move thereby in a first direction within the carrier slide frame, and the pivot abutment member being further configured to lock such that the egg carrier is prevented from passing thereby when moving within the carrier slide frame in a second direction opposite the first direction.

2. An in ovo injection apparatus according to claim 1, further comprising a terminal stop configured to abut the leading end of the egg carrier to form a terminal egg carrier position such that a third subset of the plurality of avian eggs is in alignment with the respective injection devices for injection thereof.

3. An in ovo injection apparatus according to claim 2, wherein the terminal stop is positioned at a back end of the carrier slide frame, and the intermediate stop is positioned between the forward and back ends of the carrier slide frame.

4. An in ovo injection apparatus according to claim 3, wherein the carrier slide frame comprises a pair of side rails, and further wherein the initial and terminal stops each comprise at least one abutment member operably engaged with one of the side rails at the respective one of the forward and back ends of the carrier slide frame.

5. An in ovo injection apparatus according to claim 4, wherein the abutment member of the terminal stop is fixedly engaged with one of the side rails.

6. An in ovo injection apparatus according to claim 4, wherein the pivot abutment member extends through a slot defined by one of the side rails and into the carrier slide path as defined between the side rails.

* * * * *